Jan. 10, 1933.                S. PFEFFER                1,893,634
                         SAFETY DEVICE FOR VEHICLES
                    Filed May 25, 1931      2 Sheets-Sheet 1
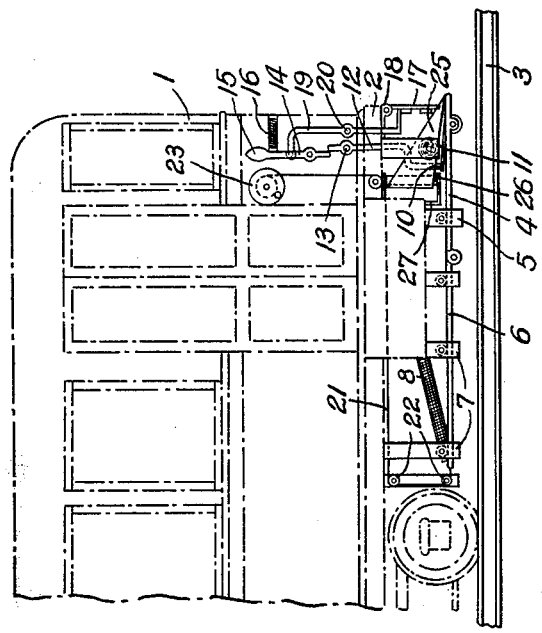
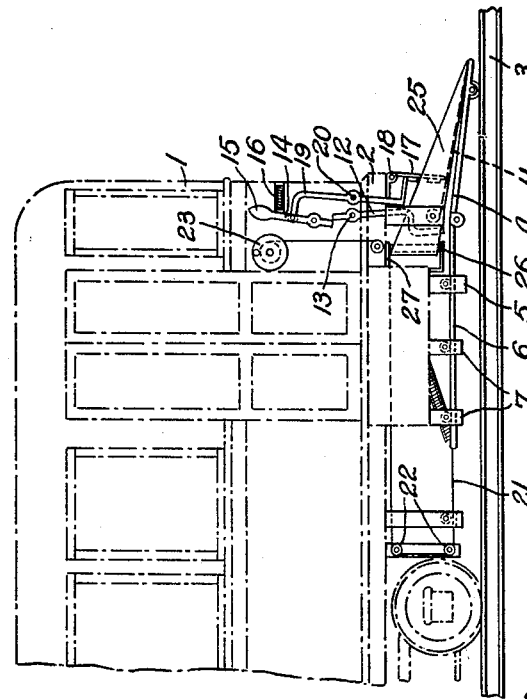
Inventor
Solomon Pfeffer
By
Attorney.

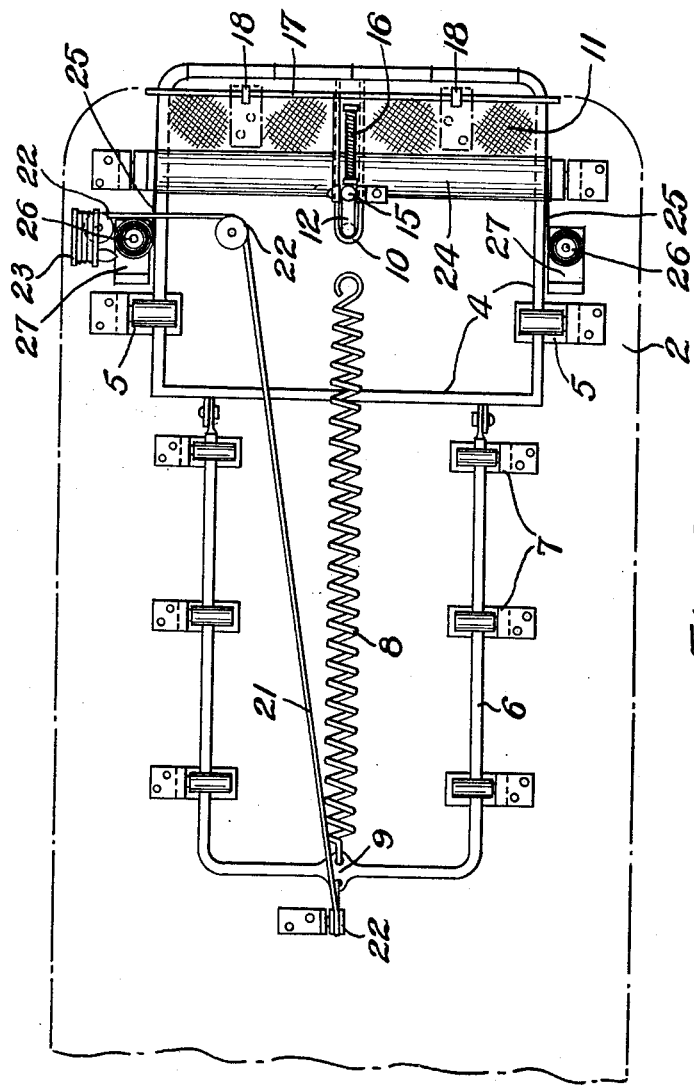

Patented Jan. 10, 1933

1,893,634

UNITED STATES PATENT OFFICE

SOLOMON PFEFFER, OF MONTREAL, QUEBEC, CANADA, ASSIGNOR OF ONE-HALF TO ROCH DESPATIS, OF MONTREAL, QUEBEC, CANADA

SAFETY DEVICE FOR VEHICLES

Application filed May 25, 1931. Serial No. 539,855.

The present invention relates to improvements in fenders for vehicles, and particularly for tramways, and comprises a horizontally disposed fender, slidably mounted beneath the floor of a tramway adjacent the rails, which is adapted to be ejected outwardly, by means of a suitable tripping mechanism, when the vertical fender, which is usually mounted upon modern tramways, touches any object.

The said tripping mechanism, may also be operated by the motorman, to cause the said fender to be ejected in operative position in case the vehicle or tramway is likely to hit a pedestrian or any other object.

The fender when ejected forwardly is so disposed, that a person hit by the vehicle will be protected from serious injury when falling down as he will fall on the fender and will thus be prevented from falling beneath the wheels.

The present invention consists in providing a fender which takes very little space and is practically invisible. When in inoperative position, the fender lies in horizontal position below the floor of the vehicle, adjacent the front, and in operative position it extends in front of the vehicle.

For the purpose of illustrating the invention, the accompanying drawings show a preferred form of the invention, although it must be understood that various means may be provided to obtain the same result, and that the present application should not be limited to the form shown and described hereinafter.

In the drawings:—

Fig. 1 represents a segmentary side elevation view in dot and dash lines of the front part of a tramway with the device according to the invention mounted thereon and shown in its inoperative position;

Fig. 2 is a similar view to Fig. 1, in which the invention is shown in its operative position; and Fig. 3 is a top view of the device according to the invention, the floor of the tramway being shown in dot and dash lines.

Like numerals of reference indicate corresponding parts in each figure.

Referring to the drawings:—

1 designates the front portion of a tramway and 2 the floor. Beneath the floor, preferably located adjacent but slightly distanced from the rails 3, is movably mounted the rectangular movable frame 4 of the fender. The said frame 4 is slidably mounted in suitable guides 5. To the rear end of said frame 4 are pivotally secured the ends of preferably a fork-shape member 6 which is also slidably mounted in suitable guides 7, said guides 5 and 7 being secured to the underside of the flooring of the tramway or to any other suitable part thereof. A strong spiral spring 8 is secured at one end at 9 to the fork-shape member 6 and at its other end to preferably the underside of the floor or to the chassis of the tramway. The said spiral spring is adapted to continually press the said member 6 forward to eject forwardly the frame 4. Suitable means of securing the said frame 4 in inoperative position will be described hereafter, but when said frame is released, the fork-shape member 6 pushes the frame 4 outwardly (see Fig. 2 of the drawings), the forward end of said frame resting upon the rails. In the present instance, it has been thought preferable to provide, adjacent the forward end of said frame, one or more rollers which will engage the rails and support said frame.

To the forward end of said frame 4 is provided preferably a U-shape member 10 which extends horizontally and inwardly and is located below or under the netting or canvas cover 11 which is mounted across the said frame 4. Hereafter, further details will be given of the means provided, if a canvas cover is used.

The said U-shape member 10 is suitably engaged by the free end of a tripping arm 12 which projects through a suitable opening in the floor of the tramway and is pivotally mounted at 13. The upper free end of said tripping arm 12 is engaged by the lower end of the pivoted arm 14 which terminates into the handle 15 and 16 is a spring which normally presses upon said handle 15 to hold said arm 14 in engagement with said tripping arm 12. It will readily be seen that when the arm 14 engages (see Fig. 1 of the drawings) the end of the tripping member 12, that the lower end of said tripping member will engage the U-shape member 10 and thus hold the frame 4 in inoperative position as shown in Fig. 1 of the drawings. Upon pushing the handle 15, to compress the spring 16, the tripping arm or member will be released and the frame 4 will be instantly ejected forwardly by means of the tension spring 8.

In this instance, the said frame 4 is described as being operated by the handle 15, but it is also operated by means of the fender 17 which is usually carried by all the tramways. The said fender 17 is, as usual, pivotally mounted at 18, at the front of the tramway and to said fender may be rigidly secured the end of the lever 19 which is pivoted at 20, said lever projecting through a suitable opening in the floor of the tramway, and is pivotally secured at its other end to arm 14 at a point above its pivot. If the fender 17 touches any object in front thereof, it will be pressed inwardly, and will thus actuate the lever 19 to pull the arm 14 to compress the spring 16 and release the tripping member 12, with the result that the frame or fender 4 will be released and will be ejected into operative position (see Fig. 2).

When it is desired to return the frame or fender 4 into its inoperative position, a preferred means consists in securing one end of a cable 21 at 9, in the fork-shape frame 6, said cable passing onto suitable pulleys 22 and securing same at its other end to a drum 23 which may be manually operated if desired. Upon winding said cable upon said drum, the fork-shape member 6 will be pulled back, thus carrying with it the frame 4. When the said frame 4 has reached its inoperative position, the lower end of the tripping arm engages in the U-shape member 10 and locks said frame in position.

The fender 4 is here illustrated as being covered with a canvas 11 but it should be understood that it may be covered by a suitable wire netting. If a wire netting is used, the frame 4 remains covered, but when using a canvas cover, it is preferable that said canvas, which is secured in this case only upon the front side of the frame, be rolled upon a spring actuated roller 24 which is disposed horizontally and across said frame whereby, when the said frame returns into its inoperative position, the canvas cover 11 will automatically roll itself upon the said roller, or unroll when the frame or fender 4 is ejected outwardly into its operative position.

Upon each side of said frame and suitably secured at the end and on either side thereof are provided the side members 25, which may also be of canvas or of any other material, said sides being also respectively mounted upon vertically mounted spring held rollers 26, said rollers being mounted in suitable brackets 27 secured to the underside of the tramway floor or chassis.

It should be readily understood that only a preferred form of the invention is herein described and illustrated, and that it is susceptible of modification in various particulars, without departing from the spirit or scope of the invention.

Having thus described my invention, what I claim is:—

1. A fender for vehicles and the like, comprising a rectangular frame horizontally and slidably mounted beneath said vehicle, means covering said frame, a slidable guide-member pivotally connected to said rectangular frame, tension means to normally press said rectangular frame forward of said vehicle into its operative position, and means to secure said frame into its inoperative position beneath said vehicle.

2. A fender for vehicles and the like, comprising a rectangular frame mounted horizontally and slidably beneath said vehicle, means for covering said frame, means to roll said covering when said frame is in its inoperative position, means to guide said frame, tension means to normally press said rectangular frame forward of said vehicle into its operative position, and means to secure said frame into its inoperative position beneath said vehicle.

3. A fender for vehicles and the like, comprising a rectangular frame mounted horizontally and slidably beneath said vehicle, means for covering said frame, means to roll said covering when said frame is in its inoperative position, flexible side members on each side of said frame, means to roll said side members when said frame is in its inoperative position, means to guide said frame, tension means to normally press said rectangular frame forward of said vehicle into its operative position, and means to secure said frame into its inoperative position beneath said vehicle.

In testimony whereof I affix my signature.
SOLOMON PFEFFER.